United States Patent
Chen et al.

(10) Patent No.: US 9,881,497 B2
(45) Date of Patent: Jan. 30, 2018

(54) DETECTING ROAD CONDITION CHANGES FROM PROBE DATA

(71) Applicant: HERE Global B.V., Eindhoven (NL)

(72) Inventors: Xin Chen, Evanston, IL (US); Vladimir Zhukov, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/155,701

(22) Filed: May 16, 2016

(65) Prior Publication Data

US 2016/0260322 A1    Sep. 8, 2016

Related U.S. Application Data

(63) Continuation of application No. 14/567,106, filed on Dec. 11, 2014, now Pat. No. 9,361,797.

(51) Int. Cl.
*G06F 19/00* (2011.01)
*G08G 1/01* (2006.01)
*G01C 7/04* (2006.01)

(52) U.S. Cl.
CPC .......... *G08G 1/0112* (2013.01); *G01C 7/04* (2013.01); *G08G 1/0129* (2013.01); *G08G 1/0141* (2013.01)

(58) Field of Classification Search
CPC .. G08G 1/0112; G08G 1/0129; G08G 1/0141; G01C 7/04; B60W 2550/402; G01S 17/023
USPC .......................... 701/117, 301, 470; 340/436
See application file for complete search history.

(56) References Cited

U.S. PATENT DOCUMENTS

| | | | |
|---|---|---|---|
| 6,768,944 B2 | 7/2004 | Breed et al. | |
| 7,577,513 B2 | 8/2009 | Kumagai et al. | |
| 8,483,940 B2 | 7/2013 | Chapman et al. | |
| 9,361,797 B1 * | 6/2016 | Chen | G08G 1/0112 |
| 2007/0087756 A1 | 4/2007 | Hoffberg | |
| 2009/0082948 A1 | 3/2009 | Hiruta et al. | |
| 2009/0140887 A1 | 6/2009 | Breed et al. | |

OTHER PUBLICATIONS

Liang Fu Lu et al., A Large-Scale Network Sata Analysis via Sparse and Low Rank Reconstruction, May 26, 2014, Tianjin University.
Sanjay Chawla et al., Inferring the Root Cause in Road Traffic Anomalies, 2012, University of Sydney.

* cited by examiner

*Primary Examiner* — Gertrude Arthur Jeanglaude
(74) *Attorney, Agent, or Firm* — Lempia Summerfield Katz LLC

(57) ABSTRACT

Systems, methods, and apparatuses are disclosed for identifying anomalies or changes in road conditions on a roadway location. An initial low rank data matrix of initial vehicle probe data at a plurality of different times for a roadway location is provided, where the initial low rank data matrix represents a baseline of road conditions for the roadway location. A plurality of additional vehicle probe data from at least one vehicle at the roadway location is received. The additional vehicle probe data is added to the initial vehicle probe data of the initial low rank data matrix. The updated data matrix with the compiled probe data is decomposed into a low rank data matrix and a sparse data matrix. A change at the roadway location is identified based on the probe data in the sparse data matrix.

20 Claims, 7 Drawing Sheets

DETECTING ROAD CONDITION CHANGES FROM PROBE DATA

This application is a continuation under 35 U.S.C §120 and 37 CRF §1.53(b) of U.S. patent application Ser. No. 14/567,106 filed Dec. 11, 2014, the disclosure of which is incorporated herein by reference in its entirety.

FIELD

The following disclosure relates to detecting road conditions or changes in road conditions using machine learning algorithms.

BACKGROUND

Traffic reporters may rely on traffic information made available by government agencies. Also, online traffic reporting resources may suffer from infrequent updates, data entry errors, or delayed data input. These factors cause the traffic reporter to fail to timely report a major traffic incident or congestion, or continue to report an incident or congestion well after the incident or congestion has been cleared. Therefore, providing real time, accurate traffic information, such as for use in a navigation system (and, in particular, for an autonomous vehicle), is a continuing effort.

To enable automated driving, route validation and planning beyond a vehicle's sensor range is important. For example, it is important to accurately and timely detect low latency road condition changes and abnormalities such as lane closures and slipperiness of the road. Detection of road condition changes or abnormalities is also important for lane positioning as the road structure and identified objects may function as references for matching vehicle sensor perception. Near real-time updates of the road structure and objects may provide correct lane positioning for the automated vehicle navigation system.

SUMMARY

Systems, methods, and apparatuses are provided for detecting road conditions or changes in road conditions at a roadway location. In one embodiment, the method comprises providing an initial low rank data matrix of initial vehicle probe data at a plurality of different times for a roadway location, the initial low rank data matrix representing a baseline of road conditions for the roadway location. The method further comprises receiving, using a processor, a plurality of additional vehicle probe data from at least one vehicle at the roadway location. The method further comprises adding the additional vehicle probe data to the initial vehicle probe data of the initial low rank data matrix to provide an updated data matrix comprising compiled probe data. The method further comprises decomposing the compiled probe data in the updated data matrix into a low rank data matrix and a sparse data matrix. The method further comprises identifying a change at the roadway location based on probe data in the sparse data matrix.

In one embodiment, the apparatus comprises at least one processor and at least one memory including computer program code for one or more programs; the at least one memory and the computer program code configured to, with the at least one processor, cause the apparatus to at least perform: (1) provide an initial low rank data matrix of initial vehicle probe data at a plurality of different times for a roadway location, the initial low rank data matrix representing a baseline of road conditions for the roadway location; (2) receive a plurality of additional vehicle probe data from at least one vehicle at the roadway location; (3) add the additional vehicle probe data to the initial vehicle probe data of the initial low rank data matrix to provide an updated data matrix comprising compiled probe data; (4) decompose the compiled probe data in the updated data matrix into a low rank data matrix and a sparse data matrix; and (5) identify a change at the roadway location based on probe data in the sparse data matrix.

BRIEF DESCRIPTION OF THE DRAWINGS

Exemplary embodiments are described herein with reference to the following drawings.

DETAILED DESCRIPTION

Figure 1:
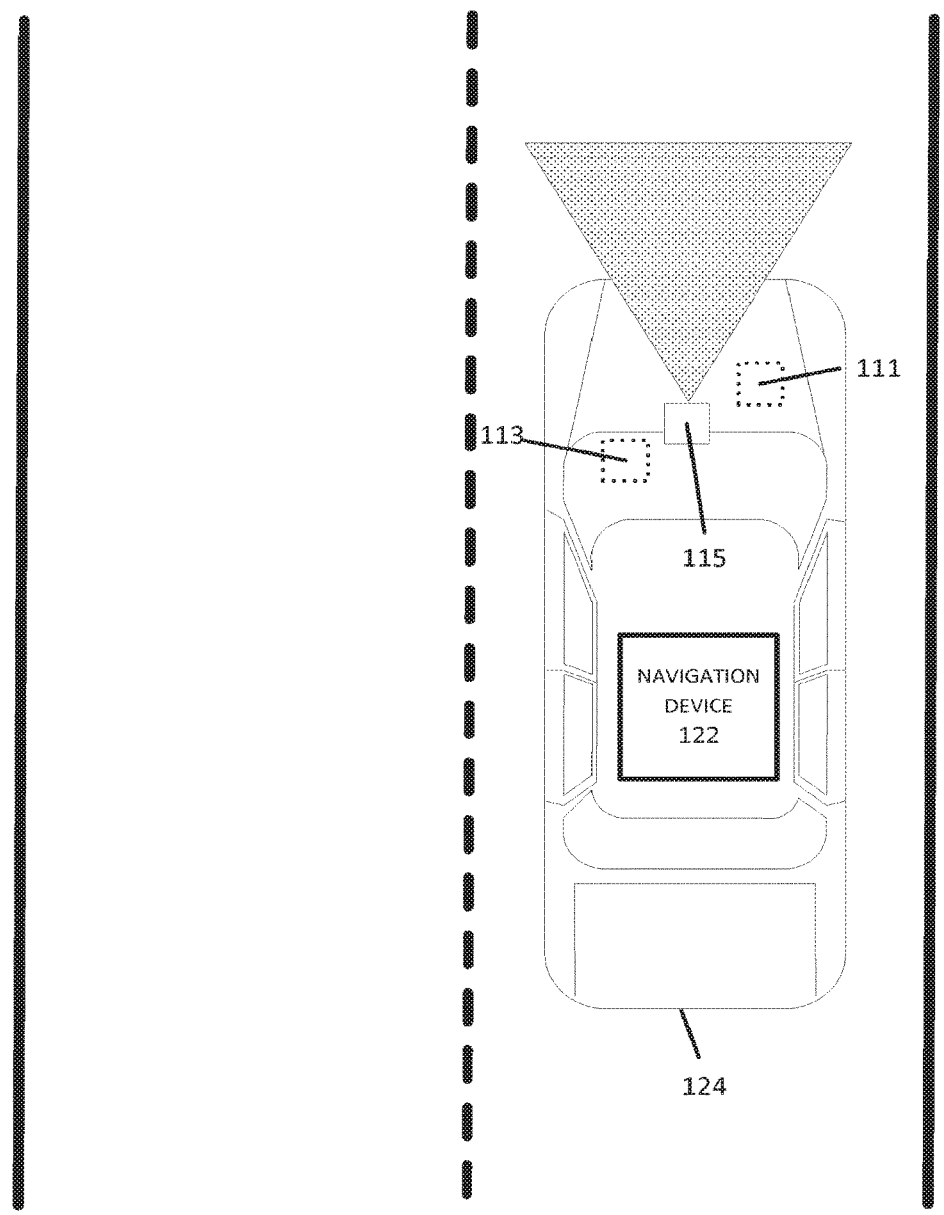
FIG. 1 illustrates an example of a vehicle comprising camera or image sensors for gathering images near the vehicle, such as lane markings.

The following embodiments include the identification of anomalies or changes in road conditions on a roadway location. The systems, methods, and apparatuses include collecting or providing an initial low rank data matrix of initial vehicle probe data at a plurality of different times for a roadway location, receiving a plurality of additional vehicle probe data from at least one vehicle at the roadway location is received, adding the additional probe data to provide an updated data matrix, and determining whether there is a change in the road condition based on an analysis of the updated data matrix.

As used herein, a "road" or "roadway" may refer to any traveling lane(s) or pathway(s) that may be capable of being observed by vehicle sensors for road conditions (e.g., markings, width, signs, slipperiness, etc.), or may become capable of being observed by vehicle sensors in the future. Non-limiting examples of a road or roadway includes a highway, city street, bus route, train route, walking/biking pathway, or waterway.

Collecting Initial Probe Data

In order to identify changes in traffic conditions for a roadway location, a baseline of normal or typical traffic conditions for the roadway location is established over a period of time (or up until a defined time t). The baseline may be established for a number of variables or vehicle probe features (discussed in greater detail below). As discussed in greater detail below, the baseline data may be compiled in an initial low rank data matrix.

In certain embodiments, vehicle probe data is collected with a navigation device transported in or on a probe vehicle (e.g., car, truck, motorcycle, bicycle, bus) or on a traveler. The navigation device is configured to calculate probe data such as geographic location, speed, and heading of the probe vehicle or traveler. The probe data may be determined through Global Positioning System (GPS) or another technique. The probe data may include speed, heading, location, timestamp, etc., as obtained from a single sensor such as GPS or a combination of sensors such as GPS, accelerometer, and gyrometer. In certain embodiments, the navigation device generates a message that provides at least one of (1) geographic location, (2) speed, (3) heading, and (4) vehicle identification (including timestamp), and sends the message to a server for processing.

In some embodiments, the vehicle containing the navigation device is an autonomous vehicle or a highly automated driving (HAD) vehicle. As described herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a "highly automated driving (HAD) vehicle" may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The autonomous or highly automated driving vehicle may include vehicle sensors for identifying the surroundings and the location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

FIG. 1 illustrates example sensors for a vehicle 124. For example, an engine sensor 111 may include throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. A vehicle sensor 113 may include a steering wheel angle sensor, a speedometer sensor, or a tachometer sensor.

An additional vehicle sensor 115 may be a camera, a light detection and ranging (LIDAR) sensor, a radar sensor, or an ultrasonic sensor. The vehicle sensor 115 may determine road status such as the shape or turns of the road, the existence of speed bumps, the existence of pot holes, the wetness of the road, or the existence or ice, snow, or slush.

In certain embodiments, the vehicle sensor 115 may identify lane or guide markings on the road, such as the left and right boundaries of the lane the vehicle is traveling (i.e., the current lane), as well as any immediate adjacent lane boundaries (i.e., the adjacent left lane boundary and the adjacent right lane boundary), to the extent the adjacent lanes exist. This information may be used (in conjunction with lane marking identifications from other vehicles) to determine the number of lanes of travel on the roadway at the roadway location. In certain embodiments, based on a determined number of lanes, the vehicle sensor 115 may assist in identifying which lane (i.e., a lane number) the vehicle is traveling.

The vehicle sensor 115 may also identify the angle between the trajectory path of the vehicle and a lane marking. The vehicle sensor 115 may also be able to gather information to determine the vehicle's distance from the current lane's left or right boundary.

Reporting Probe Data

The vehicle or navigation device may communicate with a network, wherein the probe data collected from the navigation device or vehicle sensors may be transmitted through the network and stored in a database or at the server. The transmitted probe data may then be collected and analyzed by a processor within the map developer system.

In certain embodiments, the probe data is analyzed to develop a baseline or initial low rank data matrix for analysis with future collected probe data. In establishing the baseline, the vehicle probe data is compiled and saved in an initial low rank data matrix comprising probe data points or feature vectors stored for a plurality of different observations or times up until time t. For example, the initial low rank data matrix may include probe data on a vehicle's speed (s), heading (h), and lane count (c). The data matrix may store this probe data for a number of different observations or times (e.g., times 1, 2, 3, . . . N) at the roadway location. An embodiment for the compiled baseline low rank data matrix is provided below:

$$\begin{bmatrix} s1 & h1 & c1 \\ s2 & h2 & c2 \\ s3 & h3 & c3 \\ \ldots & \ldots & \ldots \\ sN & hN & cN \end{bmatrix}$$

The baseline of vehicle probe data may be provided as an initial low rank data matrix for analysis purposes with future collected data Receiving Additional Probe Data and Forming New Data Matrix Following development of a baseline data matrix up until time t, the map developer system may receive additional vehicle probe data after time t. The probe data may be collected and transmitted through the network in a similar manner as the initial probe data. In certain embodiments, the additional probe data is collected from a single vehicle at the roadway location at a single time. In other embodiments, the additional probe data is collected from a single vehicle at the roadway location at a plurality of different times. In yet other embodiments, the additional probe data is collected from a plurality of vehicles at the roadway location at a single time. In yet further embodiments, the additional probe data is collected from a plurality of vehicles at the roadway location at a plurality of different times.

In certain embodiments, the additional vehicle probe data is added to the initial vehicle probe data of the initial low rank data matrix to provide an updated data matrix with the compiled probe data (e.g., the baseline probe data and the additional vehicle probe data collected and reported).

Decomposing Data Matrix

In certain embodiments, the updated data matrix containing the compiled probe data may be decomposed into a new low rank data matrix and a sparse data matrix (e.g., abnormal or corrupted measurements). A machine learning algorithm may be used to decompose the compiled probe data. In certain embodiments, the machine learning algorithm is a principal component analysis (PCA) algorithm or a robust principal component analysis (RPCA) algorithm.

In such algorithms, vehicle probe data is converted into a set of linearly uncorrelated variables or principal components through an orthogonal transformation, therein providing feature vectors of a covariance matrix.

Through the machine learning algorithm, the feature vectors of the compiled probe data are analyzed for trends and abnormalities (e.g., corrupted measurements). The rank of the feature vectors may be determined within the updated data matrix, wherein the rank represents the largest number of independent vectors in the matrix. Through the decomposition of the matrix, the probe data having feature vectors that are similar to other probe data are decomposed into the low rank data matrix, while abnormal data are sorted into the sparse data matrix.

Figure 2:
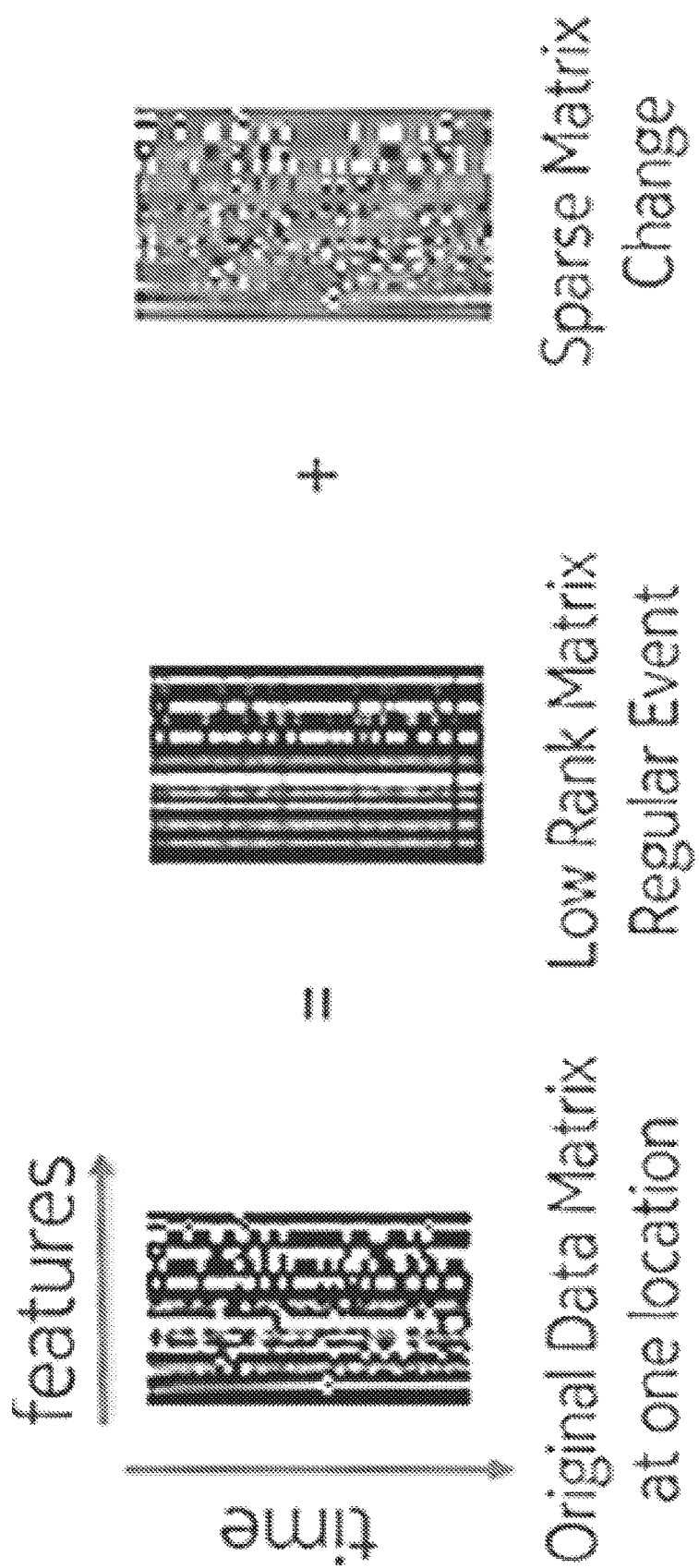
FIG. 2 illustrates an example of a data matrix decomposed into a low rank data matrix and a sparse data matrix.

FIG. 2 depicts one embodiment of a data matrix decomposed into a low rank data matrix and a sparse data matrix comprising feature vectors, where each feature is provided in different columns at different times (rows). Cumulatively, the two matrices comprise an overall data matrix of all the observations. With regard to the low rank data matrix, the vertical stripes in each column depict each feature vector at different times for the roadway location, with the stripes representing the similarity in each feature vector. With regard to the sparse data matrix, the bright spots indicate the irregular feature at the roadway location at a particular time. For example, identifying the bright spot in a sparse matrix may provide information as to what feature (column #) was different from regular, baseline events at a particular time (row #).

For example, at the roadway location, the vehicle is traveling at a similar speed or heading, or the vehicle is observing a similar number of lanes of travel, as the other probe data in the data matrix. This may be referred to as a regular event or low-rank data.

Where the rank is high, one or more of the feature vectors are considered to be different (e.g., grossly different), and the probe data is sorted or decomposed into the sparse data matrix. In other words, the additional probe data collected and reported contains at least one feature that is different from the baseline probe data feature. For example, the vehicle may be traveling at a different speed or a different heading, or may be observing a different number of lanes of travel in comparison to the compiled probe data in the data matrix. So, if the lane count observation at the roadway location is abnormal from the majority of data in the data matrix, it may mean that there is a lane closure or a road change. If the speed is different, it may mean that there is a traffic jam or incident. If the heading or direction of travel is irregular, it may be the result of construction at the roadway location, where the vehicles have been rerouted to the opposite side of the road.

The determination of whether the probe data in the combined data matrix is decomposed into the low rank data matrix or sparse data matrix may be adjustable based on the algorithm parameters. In other words, the sensitivity on determining whether the probe data is similar or dissimilar from the compiled probe data may be adjustable. For example, the threshold for determining whether the probe data is similar or dissimilar may be a 10%, 20%, or 30% change in the average value or feature vector. In other embodiments, the threshold may be based on the difference of 1 standard deviation, 2 standard deviations, etc.

Figure 3:
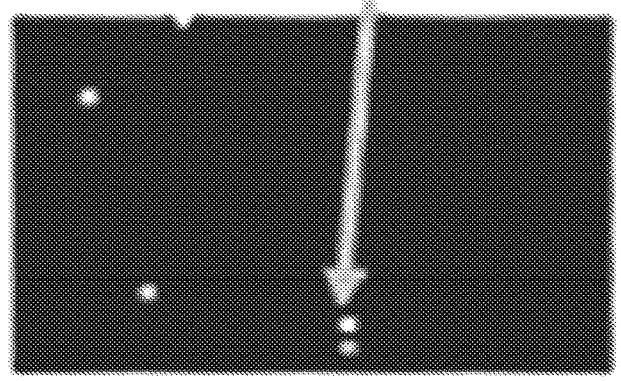
FIG. 3 illustrates examples of sparse data matrices at different levels of sensitivity.
Figure 3:
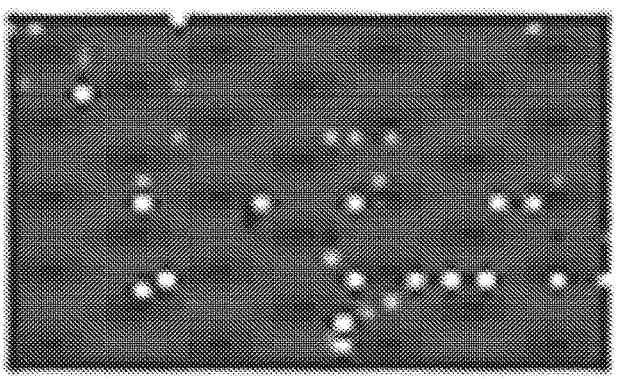

FIG. 3 depicts two examples of varying levels of sensitivity. FIG. 3(a) depicts an example where the sensitivity threshold is high, and a larger number of vehicle probe data observations are considered dissimilar or abnormal from the baseline probe data. FIG. 3(b) depicts an example where the sensitivity threshold is low, and only drastically dissimilar observations are stored in the sparse data matrix. In FIG. 3(b), as pointed out with an arrow, one vehicle reported an abnormal speed at the roadway location at a particular time.

Determining Changes and Reporting Road Conditions

Changes in road conditions may be determined based on the decomposition of the data matrix into the low rank and sparse data matrices. In particular, a change in the road condition at a certain time may be determined based on the probe data populated in the sparse data matrix. In certain embodiments, a change in a road condition at the roadway condition (e.g., speed, heading, or lane count) may be determined when there are a minimum number of abnormal observations populated in the sparse data matrix in a period of time. For example, a change in the road conditions may exist when there are at least 5, 10, 15, 20, or 25 abnormal or high-rank observations populated in the sparse data matrix in a specific period of time (e.g., 5 minutes, 10 minutes, 15 minutes, 30 minutes, 1 hour). For example, the low rank data matrix has a lane count of 4 total lanes, and there are 10 new observations within a 15 minute time frame reporting a lane count of 3 lanes, this may trigger an alert that there is a lane closure at the roadway location.

In another embodiment, a change in a road condition at the roadway condition (e.g., speed, heading, or lane count) may be determined when are minimum percentage of observations in a period of time are abnormal. For example, a change in the road conditions may exist when there at least 50%, 60%, 70%, 80%, or 90% of the observations are considered abnormal or high-rank observations in a specific period of time (e.g., 5 minutes, 10 minutes, 15 minutes, 30 minutes, 1 hour). For example, the low rank data matrix has a vehicle heading direction of West to East, and there are 10 new observations within a 15 minute time frame, and 50% of those observations are abnormal (e.g., a heading in the opposite direction from East to West), this may trigger an alert that there is a re-routing of traffic in an identified lane at the roadway location.

Following determination of a change in the road condition at the roadway location, the change may be published in the map database or reported to a traffic provider or map developer. In other embodiments, the road changes may be reported to an end-user (e.g., a navigation device in a vehicle) over a connected network. The updates to the map database and reports to the traffic provider, map developer, or end-user may take place in real-time, wherein the probe data is reported by the navigation devices in real-time, and following a collection of a threshold level of probe data anomalies, the determined road change is reported.

In some embodiments, in cases of autonomous or HAD vehicles, the vehicle may process the reported data and make a decision on whether to alert the operator or take action. In certain embodiments, the navigation device in the vehicle or another computer system in communication with the navigation device may include instructions for routing the vehicle or generate driving commands for steering the vehicle, shifting gears, increasing and decreasing the throttle, and braking based on the reported data.

Updating Low Rank Data Matrix

In certain embodiments, following reporting of a change in the road condition (e.g., a lane closure), or following continued determinations of anomalies in the road condition, the change in the road condition may be considered "permanent." As such, future determinations of road anomalies should be compared with a new, updated low rank data matrix (i.e., a new baseline).

Similar to the reporting of a change in the road condition, the determination of whether the road condition is "permanent" may be based on whether there are a minimum number of abnormal observations in a period of time (e.g., when there are at least 5, 10, 15, 20, or 25 abnormal or high-rank observations in a specific period of time, such as 5 minutes, 10 minutes, 15 minutes, 30 minutes, 1 hour). In certain embodiments, the minimum observation threshold may be equal to or higher than the threshold for reporting a road condition change.

In another embodiment, the determination of whether the road condition is "permanent" may be based on when a threshold minimum percentage of observations in a period of time are abnormal (e.g., when there at least 50%, 60%, 70%, 80%, or 90% of the observations are considered abnormal or high-rank observations in a specific period of time such as 5 minutes, 10 minutes, 15 minutes, 30 minutes, 1 hour). In certain embodiments, the minimum percentage threshold may be equal to or higher than the threshold for reporting a road condition change.

In certain embodiments, following a determination that the road condition is permanent, the low rank data may be updated to represent the change. This update may comprise decomposing at least a portion of the current data matrix into a new low rank data matrix and a new sparse matrix, wherein the new low rank data matrix comprises the probe data representing the road condition change. In other embodiments, the low rank data matrix may be updated to represent the change by selecting all of the probe data in the data matrix from a recent period of time (e.g., within the last 5 minutes, 10 minutes, 15 minutes, 30 minutes, 1 hour, 1 day, etc.) and decomposing that subset of probe data to provide the new baseline/low rank data matrix.

Flowchart Embodiment

Figure 4:
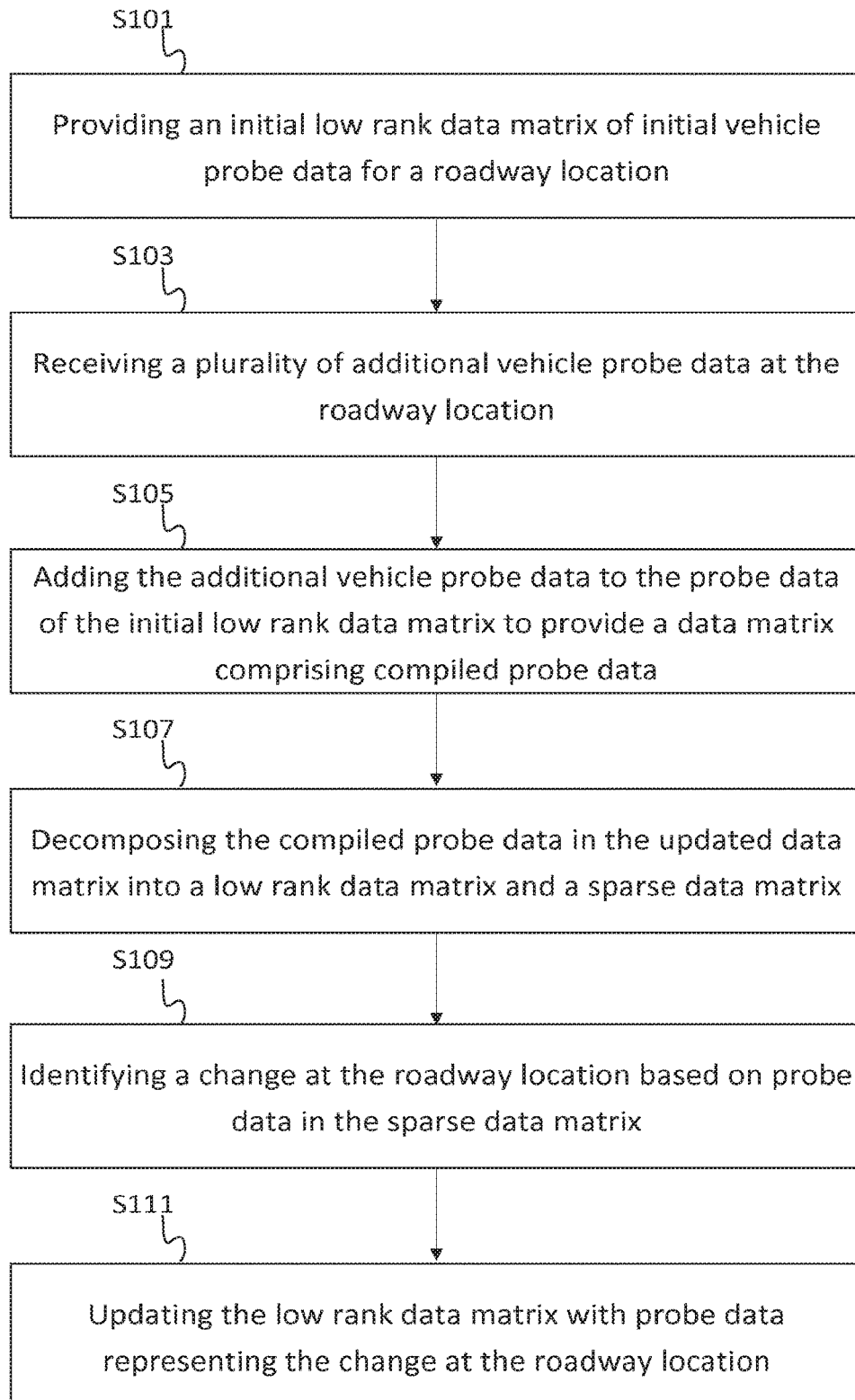
FIG. 4 illustrates an example flowchart for detecting road conditions or changes in road conditions from probe data.

FIG. 4 illustrates one embodiment of a flowchart for predicting a speed limit value and a confidence level of the predicted value. The process of the flowchart may be performed by the camera sensor, navigation device, and processor and/or a server and its processor. Alternatively, another device may be configured to perform one or more of the following acts. Additional, fewer, or different acts may be included.

At act S101, an initial low rank data matrix of initial vehicle probe data for a particular roadway location is provided or collected in a map database. The initial low rank data matrix comprises a plurality of different feature vectors at a plurality of different times for the roadway location. The data matrix may represent a substantially uniform set of probe data, therein providing a baseline for comparison against newly collected, (e.g., real-time) vehicle probe data reported to the map database for analysis.

At act S103, additional vehicle probe data at the roadway location is collected by one or more vehicles and reported to the map database server. At act S105, the additional probe data is added to the initial low rank data matrix to provide an updated data matrix comprising the compiled probe data.

At act S107, the updated data matrix is decomposed into a low rank data matrix and a sparse data matrix. In certain embodiments, a machine learning algorithm such as a robust principal component analysis (RPCA) algorithm is used for the decomposition process.

At act S109, a road condition is identified from the probe data in the sparse data matrix. In certain embodiments, this determination is based on a threshold number of abnormal observations in the sparse data matrix, such as a minimum number of abnormal observations over a period of time or a minimum percentage of abnormal observations in the period of time. Following identification of a road condition, the road condition may be used to update a map database, or the road condition may be reported to a traffic developer or end-user.

At act S111, a road condition may be determined to be "permanent," wherein the low rank data matrix is updated with the new road condition, therein creating a new baseline for future analysis (wherein the process can continue in perpetuity).

Navigation and Network System

Figure 5:
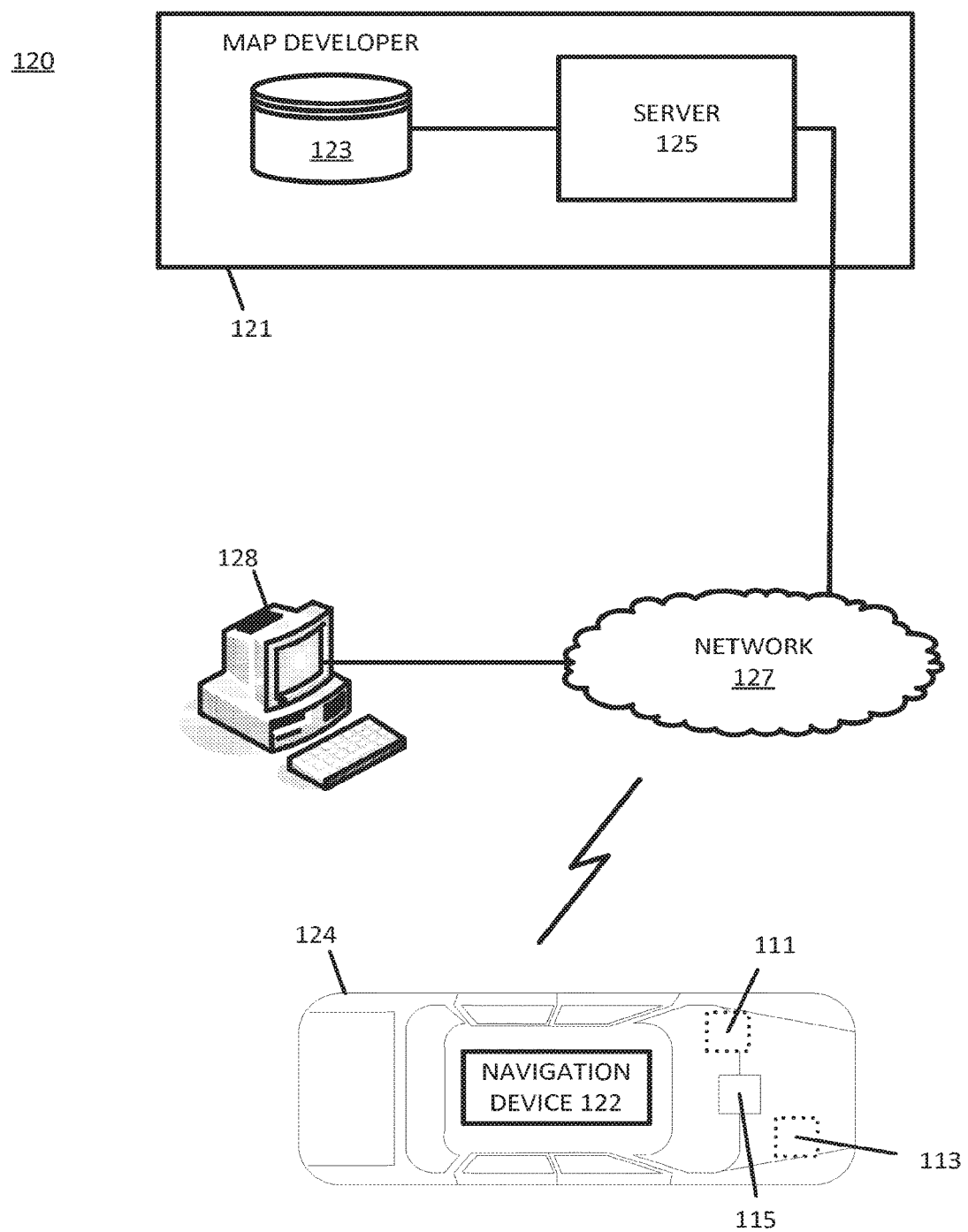
FIG. 5 illustrates an example system for relaying data between a vehicle and a data management system.

FIG. 5 illustrates an example system 120 for reporting and processing probe data from a navigation device 122 or vehicle sensor 111, 113, 115 associated with a vehicle 124 or traveler. The system 120 includes a developer system 121, one or more navigation devices 122, vehicle sensors, a workstation 128, and a network 127. Additional, different, or fewer components may be provided. For example, many navigation devices 122 and/or workstations 128 connect with the network 127. The developer system 121 includes a server 125 and a database 123. The developer system 121 may include computer systems and networks of a system operator.

The navigation device 122 or vehicle sensor may be carried by or installed within a vehicle 124. Vehicle sensors, as described with FIG. 1, may include an engine sensor 111 such as a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. A vehicle sensor 113 may include a steering wheel angle sensor, a speedometer sensor, or a tachometer sensor. An additional vehicle sensor 115 may be a camera, a light detection and ranging (LIDAR) sensor, a radar sensor, or an ultrasonic sensor. The vehicle sensor 115 may determine road status such as the shape or turns of the road, the existence of speed bumps, the existence of pot holes, the wetness of the road, or the existence or ice, snow, or slush.

The navigation device 122 may be a specialized autonomous driving computer. The navigation device 122 may calculate a vehicle confidence level based on at least one confidence factor. The confidence factors may be based on sensor data collected at the vehicle, environmental data received through the network 127, or responsiveness of the vehicle 124. Alternatively, the navigation device 122 may report sensor data to the server 125, which calculates the vehicle confidence level.

The navigation device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include RDS devices, HD radio devices, mobile phone devices, or car navigation devices such as Garmin or TomTom.

The developer system 121 includes a server 125 and a server database 123. The developer system 121 may include computer systems and networks of a system operator such as HERE, NAVTEQ, or Nokia Corporation. The server database 123 is configured to store the vehicle probe data in a data matrix.

The developer system 121, the workstation 128, and the navigation device 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests the navigation device 122 to relay current geographic locations. The workstation 128 may be used to enter data indicative of GPS accuracy to the database 123. The workstation 128 may include at least a memory, a processor, and a communication interface.

The computing resources may be divided between the server 125 and the navigation device 122. In some embodiments, the server 125 performs a majority of the processing for calculating the vehicle confidence value and the comparison with the confidence threshold. In other embodiments, the computing device 122 or the workstation 128 performs a majority of the processing. In addition, the processing is divided substantially evenly between the server 125 and the computing device 122 or workstation 128.

Figure 6:
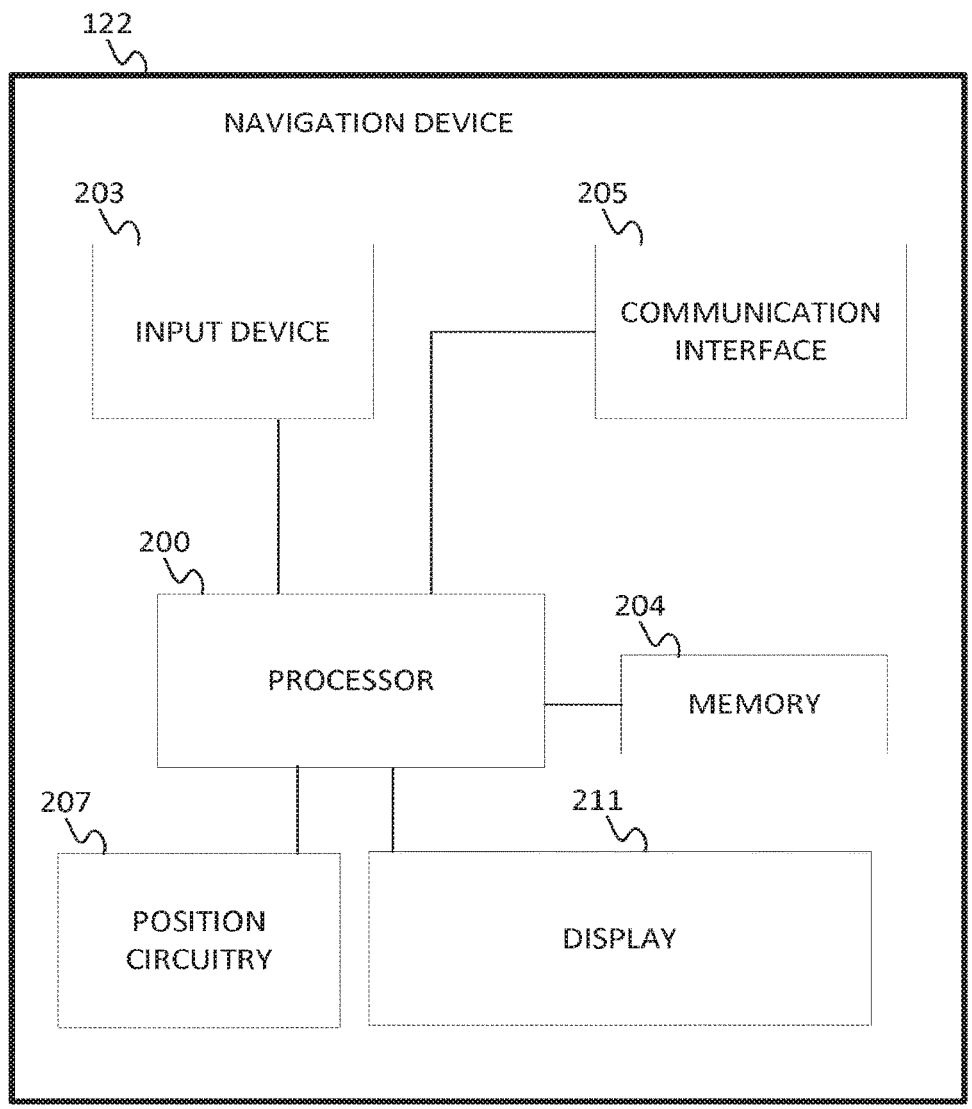
FIG. 6 illustrates an example navigation device of the system of FIG. 5.

FIG. 6 illustrates an exemplary navigation device 122 of the system of FIG. 5. The navigation device 122 includes a processor 200, a memory 204, an input device 203, a communication interface 205, position circuitry 207, and a display 211. Additional, different, or fewer components are possible for the mobile device/personal computer 122.

The processor 200 may be configured to receive data indicative of the location of the navigation device 122 from the position circuitry 207. The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 7:
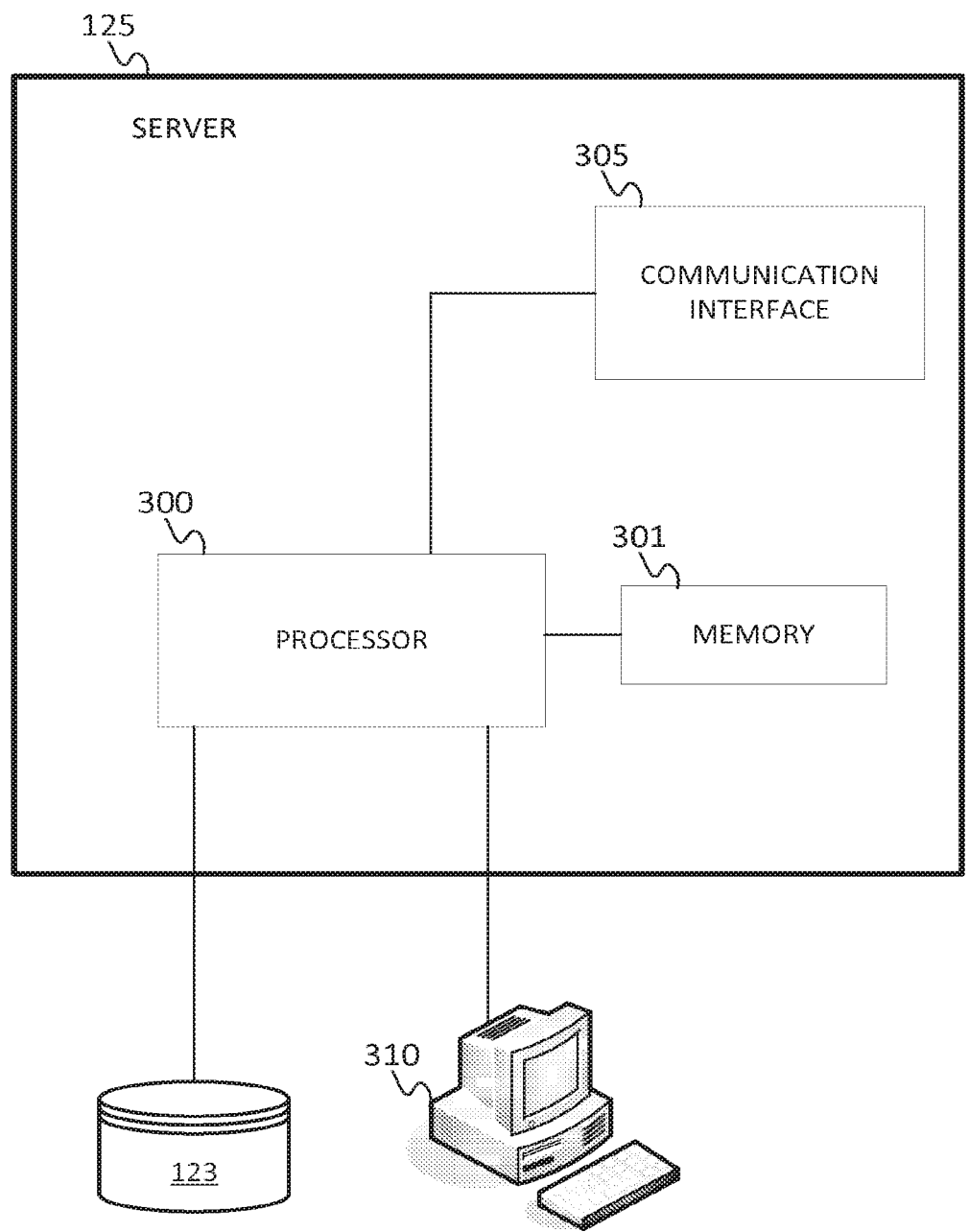
FIG. 7 illustrates an example server of the system of FIG. 5.

FIG. 7 illustrates an exemplary server 125 of the system of FIG. 5. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of use inputs made via the workstation 128 or the navigation device 122.

The navigation device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing.

The navigation device processor 200 and/or the server processor 300 may also be configured to cause an apparatus to at least perform at least one of methods described above. For example, the navigation device processor 200 may be configured to collect and transmit vehicle probe data for a roadway location.

In another embodiment, the server processor 300 may be configured to compile or provide a baseline data matrix of vehicle probe data for the roadway location. The server processor 300 may also be configured to receive a plurality of additional vehicle probe data from at least one vehicle at the roadway location, and run an algorithm to decompose the combined probe data in a data matrix into the low rank data matrix and sparse data matrix. The server processor 300 may also be configured to identify a change at the roadway location based on the probe data in the sparse data matrix.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   identifying, using a processor, a set of vehicle probe data associated with a roadway location;
   performing, using the processor, a comparison of the set of vehicle probe data to a baseline for the roadway location;
   dividing, using the processor, the set of vehicle probe data into a sparse subset and a low rank subset, wherein the sparse subset includes abnormalities or corrupted values with respect to the baseline; and
   identifying, using the processor, a change at the roadway location based on vehicle probe data in the sparse subset.

2. The method of claim 1, wherein the set of vehicle probe data includes a vehicle speed, a heading, and observed objects or events.

3. The method of claim 1, wherein the sparse set includes first feature vectors and low rank subset includes second feature vectors.

4. The method of claim 2, wherein the first feature vectors and the second feature vectors include a set of linearly uncorrelated variables.

5. The method of claim 1, wherein performing the comparison further comprises:
   ranking the set of vehicle probe data.

6. The method of claim 1, wherein the change at the roadway location includes a traffic incident.

7. The method of claim 1, further comprising:
   comparing a number of observations in the sparse subset to a threshold, wherein the change at the roadway location is based on the number of observations in the sparse subset exceeding the threshold.

8. The method of claim 1, further comprising:
   triggering an alert that traffic has been rerouted based on the change at the roadway location.

9. The method of claim 1, further comprising:
   reporting the change in the roadway location to a navigation device.

10. An apparatus comprising:
at least one processor; and
at least one memory including computer program code for one or more programs; the at least one memory and the computer program code configured to, with the at least one processor, cause the apparatus to at least perform:
identifying a set of probe data associated with a roadway location;
performing a comparison of the set of probe data to a baseline for the roadway location;
dividing the set of probe data into a sparse subset and a regular subset, wherein the sparse subset includes abnormalities or corrupted values with respect to the baseline; and
identifying an event at the roadway location based on probe data in the sparse subset.

11. The apparatus of claim 10, wherein the set of probe data includes a speed, a heading, and observed objects and events.

12. The apparatus of claim 10, wherein the sparse set includes first feature vectors and regular subset includes second feature vectors.

13. The apparatus of claim 12, wherein the comparison includes a ranking of the first feature vectors and second feature vectors is based on a number of independent vectors.

14. The apparatus of claim 12, wherein the first feature vectors and the second feature vectors include a set of linearly uncorrelated variables.

15. The apparatus of claim 10, wherein the event at the roadway location includes a traffic incident.

16. The apparatus of claim 10, at least one memory and the computer program code configured to, with the at least one processor, cause the apparatus to at least perform:
comparing a number of observations in the sparse subset to a threshold, wherein the event at the roadway location is based on the number of observations in the sparse subset exceeding the threshold.

17. The apparatus of claim 10, at least one memory and the computer program code configured to, with the at least one processor, cause the apparatus to at least perform:
generating an alert that traffic has been rerouted based on the event at the roadway.

18. The apparatus of claim 10, at least one memory and the computer program code configured to, with the at least one processor, cause the apparatus to at least perform:
reporting the event at the roadway location to a navigation device.

19. A non-transitory computer-readable medium including instructions that when executed perform:
identifying a set of probe data associated with a roadway location;
performing a comparison of the set of probe data to a baseline for the roadway location;
dividing the set of probe data into a sparse subset and a regular subset, wherein the sparse subset includes at least one abnormality or at least one corrupted value with respect to the baseline; and
identifying an incident based on probe data in the sparse subset.

20. A method comprising:
identifying a set of probe data associated with a roadway location;
performing a comparison of the set of probe data to a baseline for the roadway location;
identifying a sparse subset from the set of probe data, wherein the sparse subset includes abnormalities or corrupted values with respect to the baseline; and
identifying an event at the roadway location based on probe data in the sparse subset.

* * * * *